United States Patent
Wu (10) Patent No.: US 9,057,904 B2
(45) Date of Patent: *Jun. 16, 2015

(54) LIQUID CRYSTAL DISPLAY MODULE

(71) Applicant: TIANJIN FUNAYUANCHUANG TECHNOLOGY CO., LTD., Tianjin (CN)

(72) Inventor: Ho-Chien Wu, Hsinchu (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,958

(22) Filed: Apr. 25, 2013

(65) Prior Publication Data

US 2014/0022464 A1    Jan. 23, 2014

(30) Foreign Application Priority Data

Jul. 23, 2012 (CN) .......................... 2012 1 02544190

(51) Int. Cl.
  *G02F 1/1335* (2006.01)
  *G02F 1/1333* (2006.01)
  *B82Y 20/00* (2011.01)

(52) U.S. Cl.
  CPC ......... *G02F 1/13338* (2013.01); *Y10S 977/742* (2013.01); *B82Y 20/00* (2013.01)

(58) Field of Classification Search
  CPC ................................. H01L 21/00; G06F 3/00
  USPC ............ 349/96, 2, 139; 977/742, 842; 438/30
  See application file for complete search history.

(56) References Cited

U.S. PATENT DOCUMENTS

| | | | |
|---|---|---|---|
| 8,125,878 B2* | 2/2012 | Jiang et al. ............... | 369/173 |
| 8,199,119 B2* | 6/2012 | Jiang et al. ............... | 345/173 |
| 8,237,669 B2* | 8/2012 | Jiang et al. ............... | 345/173 |
| 8,237,671 B2* | 8/2012 | Jiang et al. ............... | 345/173 |
| 8,237,675 B2* | 8/2012 | Jiang et al. ............... | 345/173 |
| 8,242,670 B2* | 8/2012 | Kim et al. ................. | 313/112 |
| 8,243,029 B2* | 8/2012 | Jiang et al. ............... | 345/173 |
| 8,248,381 B2* | 8/2012 | Jiang et al. ............... | 345/173 |
| 8,253,700 B2* | 8/2012 | Jiang et al. ............... | 345/173 |
| 8,253,701 B2* | 8/2012 | Liu et al. .................. | 345/173 |

(Continued)

FOREIGN PATENT DOCUMENTS

| | | |
|---|---|---|
| TW | 201017264 | 5/2010 |
| TW | 201033880 | 9/2010 |

(Continued)

*Primary Examiner* — Telly Green
(74) *Attorney, Agent, or Firm* — Novak Druce Connolly Bove + Quigg LLP (57) ABSTRACT

A liquid crystal display module includes a liquid crystal module and a polarizer stacked with each other. The polarizer includes a polarizing layer, a transparent conductive layer and a number of driving-sensing electrodes. The polarizing layer and the transparent conductive layer stacked with each other. The transparent conductive layer is an anisotropic impedance layer having a relatively low impedance direction. An electrical conductivity of the anisotropic impedance layer on the relatively low impedance direction is greater than electrical conductivities of the anisotropic impedance layer on other directions. The number of driving-sensing electrodes are spaced from each other and arranged in a row along a direction substantially perpendicular to the relatively low impedance direction and electrically connected with the transparent conductive layer.

15 Claims, 12 Drawing Sheets

(56) References Cited

U.S. PATENT DOCUMENTS

| | | | |
|---|---|---|---|
| 8,253,870 B2* | 8/2012 | Qian et al. | 349/12 |
| 8,260,378 B2* | 9/2012 | Jiang et al. | 455/575.1 |
| 8,325,585 B2* | 12/2012 | Jiang et al. | 369/173 |
| 8,346,316 B2* | 1/2013 | Jiang et al. | 455/575.1 |
| 8,411,044 B2* | 4/2013 | Liu et al. | 345/173 |
| 8,416,351 B2* | 4/2013 | Liu et al. | 349/12 |
| 8,587,733 B2* | 11/2013 | Liu et al. | 349/12 |
| 2004/0218132 A1* | 11/2004 | Song et al. | 349/145 |
| 2005/0253990 A1* | 11/2005 | Song et al. | 349/145 |
| 2009/0153502 A1* | 6/2009 | Jiang et al. | 345/173 |
| 2009/0153504 A1* | 6/2009 | Liu et al. | 345/173 |
| 2009/0153507 A1* | 6/2009 | Jiang et al. | 345/173 |
| 2009/0153509 A1* | 6/2009 | Jiang et al. | 345/173 |
| 2009/0153511 A1* | 6/2009 | Jiang et al. | 345/173 |
| 2009/0153513 A1* | 6/2009 | Liu et al. | 345/173 |
| 2009/0153514 A1* | 6/2009 | Jiang et al. | 345/173 |
| 2009/0153515 A1* | 6/2009 | Jiang et al. | 345/173 |
| 2009/0153521 A1* | 6/2009 | Jiang et al. | 345/174 |
| 2009/0167708 A1* | 7/2009 | Jiang et al. | 345/173 |
| 2009/0167710 A1* | 7/2009 | Jiang et al. | 345/173 |
| 2010/0048250 A1* | 2/2010 | Jiang et al. | 455/566 |
| 2010/0048254 A1* | 2/2010 | Jiang et al. | 455/566 |
| 2010/0073322 A1* | 3/2010 | Jiang et al. | 345/174 |
| 2010/0097344 A1 | 4/2010 | Verweg | |
| 2010/0215985 A1* | 8/2010 | Kitano | 428/688 |
| 2010/0231549 A1 | 9/2010 | Chien et al. | |
| 2010/0271316 A1 | 10/2010 | Huang et al. | |
| 2010/0315374 A1* | 12/2010 | Chen et al. | 345/174 |
| 2010/0317409 A1* | 12/2010 | Jiang et al. | 455/566 |
| 2010/0323186 A1* | 12/2010 | Maruyama | 428/323 |
| 2011/0025645 A1* | 2/2011 | Mata et al. | 345/174 |
| 2011/0032196 A1* | 2/2011 | Feng et al. | 345/173 |
| 2011/0115740 A1* | 5/2011 | Qian et al. | 345/174 |
| 2011/0171419 A1* | 7/2011 | Li et al. | 428/113 |
| 2011/0204300 A1* | 8/2011 | Kitano | 252/519.3 |
| 2011/0242046 A1* | 10/2011 | Feng et al. | 345/174 |
| 2011/0292311 A1* | 12/2011 | Qian et al. | 349/38 |
| 2011/0299015 A1* | 12/2011 | Liu et al. | 349/96 |
| 2011/0304800 A1* | 12/2011 | Liu et al. | 349/96 |
| 2013/0127776 A1* | 5/2013 | Guard et al. | 345/174 |
| 2013/0314648 A1* | 11/2013 | Rappoport et al. | 349/96 |

FOREIGN PATENT DOCUMENTS

| | | |
|---|---|---|
| TW | 201038997 | 11/2010 |
| TW | 098134306 | 4/2011 |
| TW | 201131452 | 9/2011 |
| TW | 201200937 | 1/2012 |
| TW | 201222349 | 6/2012 |
| TW | 201229579 | 7/2012 |

* cited by examiner

LIQUID CRYSTAL DISPLAY MODULE

CROSS-REFERENCE TO RELATED APPLICATIONS

This application claims all benefits accruing under 35 U.S.C. §119 from China Patent Application No. 201210254419.0, filed on Jul. 23, 2012, in the China Intellectual Property Office, the disclosure of which is incorporated herein by reference. The application is also related to copending application entitled, "LIQUID CRYSTAL DISPLAY MODULE", filed Apr. 25, 2013 Ser. No. 13/869,959; "METHOD FOR MAKING LIQUID CRYSTAL DISPLAY MODULE", filed Apr. 25, 2013 Ser. No. 13/869,961; AND "METHOD FOR MAKING LIQUID CRYSTAL DISPLAY MODULE", filed Apr. 25, 2013 Ser. No. 13/869,964; "LIQUID CRYSTAL DISPLAY MODULE", U.S. application Ser. No. 13/837,266, filed Mar. 15, 2013, and "LIQUID CRYSTAL DISPLAY MODULE", U.S. application Ser. No. 13/837,359 filed Mar. 15, 2013; "POLARIZER", U.S. application Ser. No. 13/730,711, filed Dec. 28, 2012; "POLARIZER", U.S. application Ser. No. 13/730,884, filed Dec. 29, 2012.

BACKGROUND

1. Technical Field

The present disclosure relates to liquid crystal display module, particularly to a liquid crystal display module with touch sensing capability.

2. Description of Related Art

A conventional liquid crystal display module for a liquid crystal display (LCD), according to the prior art, generally includes a first polarizer, a thin film transistor panel, a first alignment layer, a liquid crystal layer, a second alignment layer, a common electrode layer (e.g., an indium tin oxide (ITO) layer), an upper board, and a second polarizer. The TFT panel includes a plurality of pixel electrodes. The polarizing directions of the first and second polarizer are perpendicular to each other. When a voltage is applied between the pixel electrode and the common electrode layer, the liquid crystal molecules in the liquid crystal layer between the first alignment layer and the second alignment layer align along a same direction to make the light beams polarized by the first polarizer irradiate on the second polarizer directly without rotation. The polarized light beams cannot pass through the first polarizer. Without a voltage applied to the pixel electrode and the common electrode layer, the polarized light beams rotated by the liquid crystal molecules can pass through the second polarizer. Selectively applying voltages between different pixel electrodes and the common electrode layer can control the on and off of different pixels, thus displaying images.

A conventional polarizing layer is made by using a transparent polymer film (e.g., PVA film) to absorb the dichroism material, and the dichroism material. The dichroism material is infiltrated into the transparent polymer film, and the transparent polymer film aligns with the dichroism material in one direction. In addition to the polarizing layer, the conventional polarizer also includes protective layers, adhesive layer, separating layer covered on two opposite surfaces of the polarizing layer. During the manufacturing of the liquid crystal display screen, the second polarizer is directly attached to a top surface of the upper board.

In recent years, there is continuous growth in the number of electronic apparatuses equipped with optically transparent touch panels in front of their respective display devices (e.g., liquid crystal display screen). The touch panel is commonly attached to the top surface of the second polarizer. However, this arrangement will increase a thickness of the electronic apparatuses. Further, the touch panel and the second polarizer are individually manufactured and assembled, which increases the complexity of the manufacturing process, and increases the cost for production.

What is needed, therefore, is to provide a LCD module for solving the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
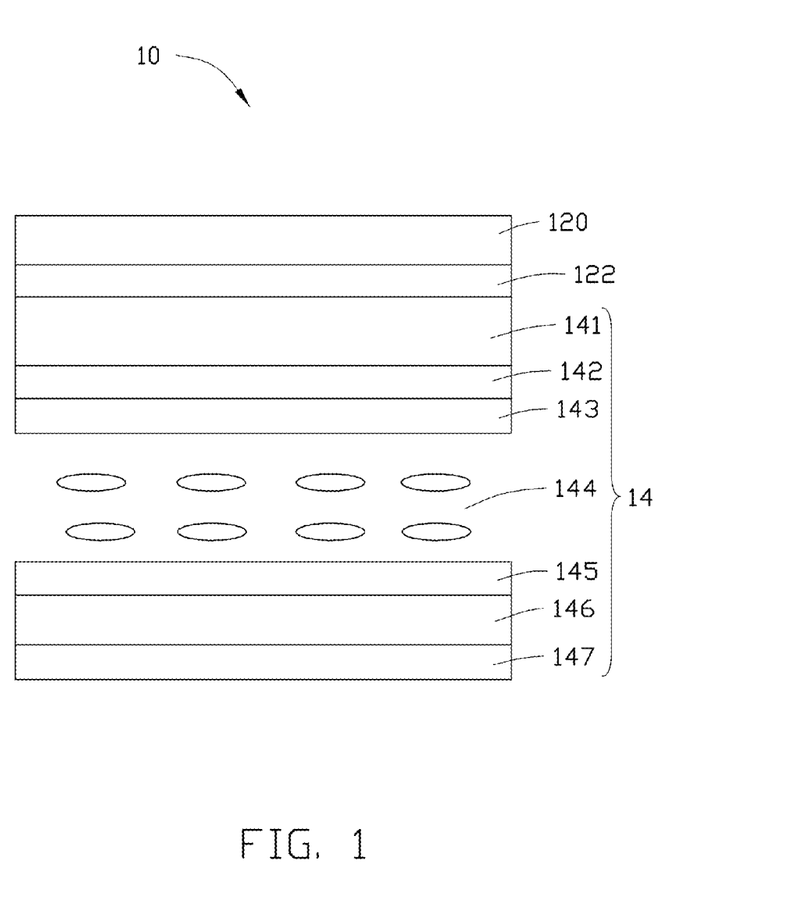
FIG. 1 is a schematic cross-sectional view of an embodiment of a LCD module.
Figure 2:
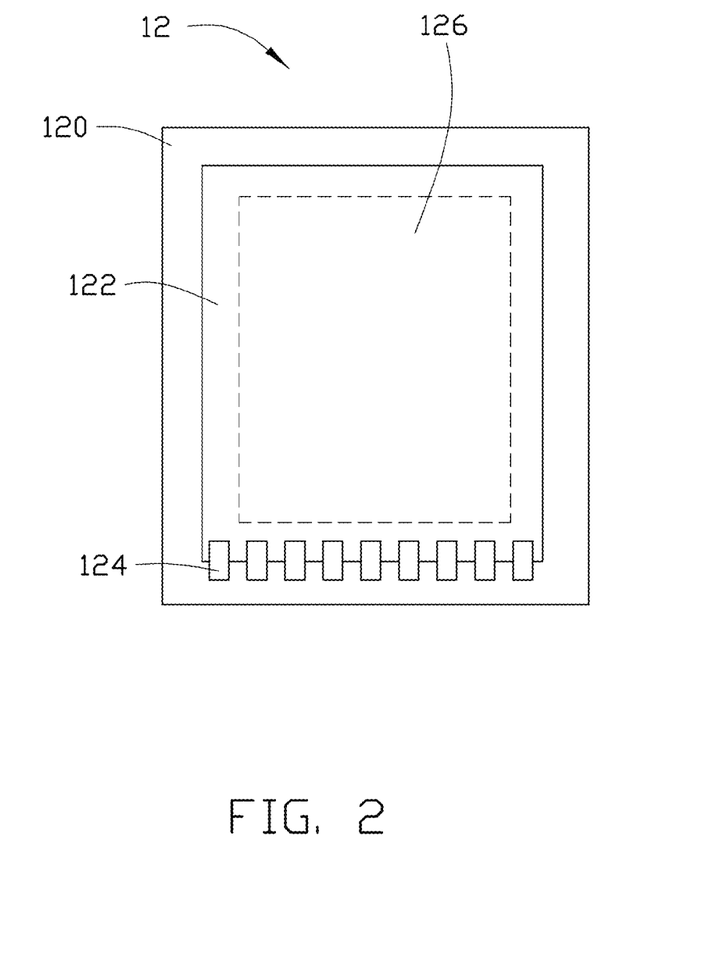
FIG. 2 is a schematic view of an embodiment of a polarizer in the LCD module of FIG. 1.

Referring to FIG. 1 and FIG. 2, one embodiment of a liquid crystal display (LCD) module 10 includes a polarizer 12 and a liquid crystal module 14 disposed on a surface of the polarizer 12. The polarizer 12 is capable of sensing touches, occurred thereon, and polarizing light. The polarizer 12 is an integral structure which can be independent and free installation and disassembling.

The polarizer 12 includes a first polarizing layer 120, a transparent conductive layer 122, and a plurality of driving-sensing electrodes 124. The first polarizing layer 120 and the transparent conductive layer 122 are stack with other. The plurality of driving-sensing electrodes 124 are spaced from each other and electrically connected with the transparent conductive layer 122.

The first polarizing layer 120 can be an insulating material layer having a light polarizing function. More specifically, the first polarizing layer 120 includes a transparent polymer film (e.g., PVA film) and a dichroism material infiltrated in the transparent polymer film. The dichroism material can be iodoquinine sulfate. The molecules of the dichroism material can align along the same direction.

The transparent conductive layer 122 can be directly in contact with a surface of the first polarizing layer 120. The transparent conductive layer 122 can be an anisotropic impedance layer. In the present disclosure, the anisotropic impedance means a structure having a relatively low impedance direction D and a relatively high impedance direction H on the same surface (e.g., the surface of the transparent conductive layer 122). The electrical conductivity of the anisotropic impedance layer on the relatively high impedance direction H is smaller than the electrical conductivities of the anisotropic impedance layer on other directions. The electrical conductivity of the anisotropic impedance layer on the relatively low impedance direction D is larger than the electrical conductivities of the anisotropic impedance layer in other directions. The relatively high impedance direction H is different from the relatively low impedance direction D. In one embodiment, the relatively high impedance direction H is perpendicular to the relatively low impedance direction D. The relatively high impedance direction H and the relatively low impedance direction D of the anisotropic impedance layer can be achieved by having a plurality of conductive belts having a low conductivity aligned along the relatively high impedance direction H and a plurality of conductive belts having a high conductivity aligned along the relatively low impedance direction D, and the plurality of conductive belts having the low conductivity and the plurality of conductive belts having the low conductivity are electrically connected with each other. In another embodiment, the relatively high impedance direction H and the relatively low impedance direction D of the anisotropic impedance layer can be achieved by having a carbon nanotube film comprising orderly arranged carbon nanotubes. The transparent conductive layer 122 can have a square shape having two sides perpendicular to the relatively high impedance direction H and two sides perpendicular to the relatively low impedance direction D.

The plurality of driving-sensing electrodes 124 are spaced with each other and arranged in a row along the relatively high impedance direction H. More specifically, the plurality of driving-sensing electrodes 124 are arranged on at least one side of the transparent conductive layer 122, perpendicular to the relatively low impedance direction D. A length along the relatively high impedance direction H of each driving-sensing electrode 124 can be between about 1 mm to about 8 mm. A distance between the two adjacent driving-sensing electrodes 124 can be between about 3 mm to about 5 mm. The plurality of driving-sensing electrodes 124 can be made of at least one material of a metal, a conductive polymer, and a carbon nanotube layer including a plurality of carbon nanotubes. A signal inputs by each driving-sensing electrode 124 to the transparent conductive layer 122, or received from the transparent conductive layer 122, will transmit primarily along the relatively low impedance direction D. The directional characteristic of the signal transmittance in the transparent conductive layer 122 can be used as a determining basis for the polarizer 12 to determine a touch location. It is to be understood that the size and pitch of the driving-sensing electrodes 124 can change depending on the desired resolution and application. The plurality of driving-sensing electrodes 124 can be located on the surface of the transparent conductive layer 122 away from the first polarizing layer 120, near the side. The driving-sensing electrodes 124 can be formed by screen printing, sputtering, evaporating, or coating methods. The transparent conductive layer 122 and the plurality of driving-sensing electrodes 124 cooperatively form a touch control module.

In one embodiment, the transparent conductive layer 122 includes the carbon nanotube film comprising the plurality carbon nanotubes orderly arranged. The plurality of carbon nanotubes are substantially aligned along a same direction so that the carbon nanotube film has a maximum electrical conductivity at the aligned direction of the carbon nanotubes which is greater than at other directions. The aligned direction of the plurality of carbon nanotubes is the relatively low impedance direction D. The carbon nanotube film can be formed by drawing the film from a carbon nanotube array. The overall aligned direction of a majority of the carbon nanotubes in the carbon nanotube film is substantially aligned along the same direction and parallel to a surface of the carbon nanotube film. The carbon nanotube is joined to adjacent carbon nanotubes end to end by van der Waals force therebetween, and the carbon nanotube film is capable of being a free-standing structure. A support having a large surface area to support the entire free-standing carbon nanotube film is not necessary, and only a supportive force at opposite sides of the film is sufficient. The free-standing carbon nanotube film can be suspended and maintain its own film state with only supports at the opposite sides of the film. When disposing (or fixing) the carbon nanotube film between two spaced supports, the carbon nanotube film between the two supports can be suspended while maintaining its integrity. The successively and aligned carbon nanotubes joined end to end by van der Waals attractive force in the carbon nanotube film is the main reason for the free-standing property. The carbon nanotube film drawn from the carbon nanotube array has a good transparency. In one embodiment, the carbon nanotube film is substantially a pure film and consists essentially of the carbon nanotubes, and to increase the transparency of the touch panel, the carbon nanotubes are not functionalized. The free-standing carbon nanotube film can be directly attached to the surface of the first polarizing layer 120.

Figure 3:
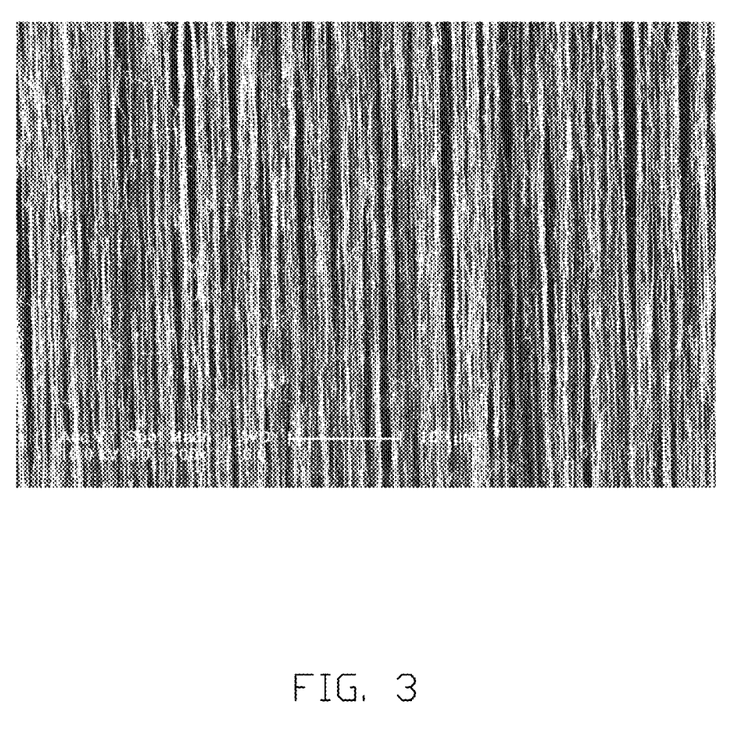
FIG. 3 shows a scanning electron microscope image of a carbon nanotube film.

Referring to FIG. 3, the plurality of carbon nanotubes in the carbon nanotube film have a preferred orientation along the same direction. The preferred orientation means that the overall aligned direction of the majority of carbon nanotubes in the carbon nanotube film is substantially along the same direction. The overall aligned direction of the majority of carbon nanotubes is substantially parallel to the surface of the carbon nanotube film, thus parallel to the surface of the polarizing layer. Furthermore, the majority of carbon nanotubes are joined end to end therebetween by van der Waals force. In this embodiment, the majority of carbon nanotubes are substantially aligned along the same direction in the carbon nanotube film, with each carbon nanotube joined to adjacent carbon nanotubes at the aligned direction of the carbon nanotubes end to end by van der Waals force. There may be a minority of carbon nanotubes in the carbon nanotube film that are randomly aligned, but the number of randomly aligned carbon nanotubes is very small compared to the majority of substantially aligned carbon nanotubes and therefore will not affect the overall oriented alignment of the majority of carbon nanotubes in the carbon nanotube film.

In the carbon nanotube film, the majority of carbon nanotubes that are substantially aligned along the same direction may not be completely straight. Sometimes, the carbon nanotubes can be curved or not exactly aligned along the overall aligned direction, and can deviate from the overall aligned direction by a certain degree. Therefore, it cannot be excluded that partial contacts may exist between the juxtaposed carbon nanotubes in the majority of carbon nanotubes aligned along the same direction in the carbon nanotube film. Despite having curved portions, the overall alignment of the majority of the carbon nanotubes are substantially aligned along the same direction.

Figure 4:
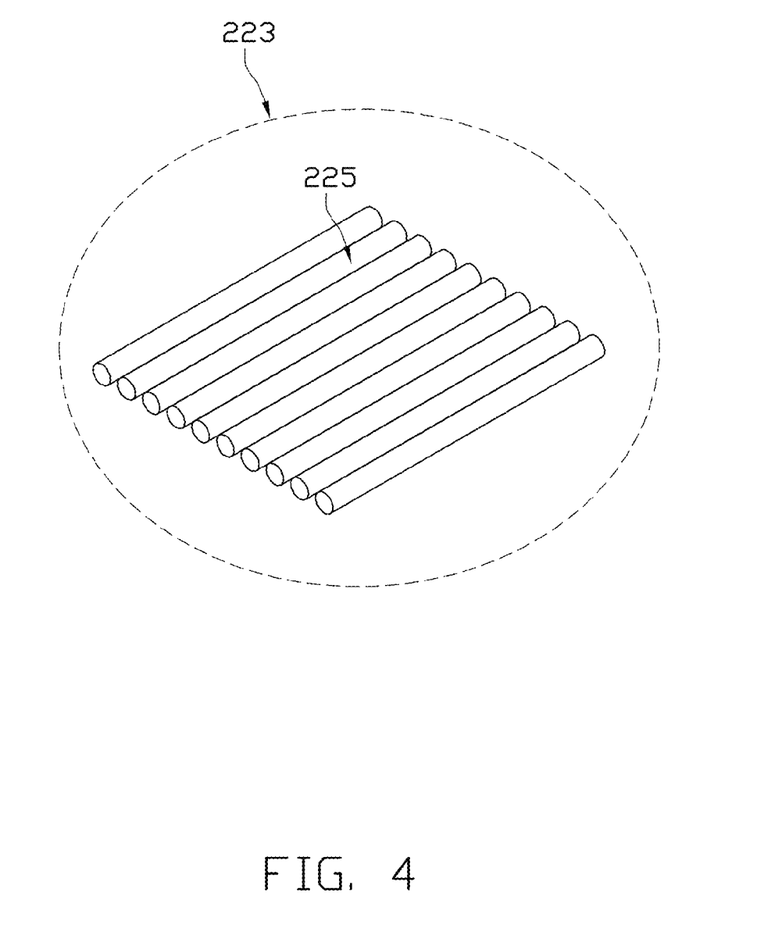
FIG. 4 is a schematic view of a carbon nanotube segment of the carbon nanotube film.

Referring to FIG. 4, the carbon nanotube film includes a plurality of successive and oriented carbon nanotube segments 223. The plurality of carbon nanotube segments 223 are joined end to end by van der Waals attractive force. Each carbon nanotube segment 223 includes a plurality of carbon nanotubes 225 that are substantially parallel to each other, and the plurality of parallel carbon nanotubes 225 are in contact with each other and combined by van der Waals attractive force therebetween. The carbon nanotube segment 223 can have a desired length, thickness, uniformity, and shape. The carbon nanotubes 225 in the carbon nanotube film have a preferred orientation along the same direction. The carbon nanotube wires in the carbon nanotube film can consist of a plurality of carbon nanotubes joined end to end. The adjacent and juxtaposed carbon nanotube wires can be connected by the randomly aligned carbon nanotubes. There can be clearances between adjacent and juxtaposed carbon nanotubes in the carbon nanotube film. A thickness of the carbon nanotube film at the thickest location is about 0.5 nanometers to about 100 microns (e.g., in a range from 0.5 nanometers to about 10 microns).

A method for drawing the carbon nanotube film from the carbon nanotube array includes: (a) selecting a carbon nanotube segment 223 from a carbon nanotube array using a drawing tool, such as an adhesive tape or adhesive substrate bar contacting the carbon nanotube array, to select the carbon nanotube segment 223; and (b) moving the drawing tool and drawing the selected carbon nanotube segment 223 at a certain speed, such that a plurality of carbon nanotube segments 223 are drawn joined end to end, thereby forming a successive carbon nanotube film. The plurality of carbon nanotubes of the carbon nanotube segment 223 are juxtaposed to each other. While the selected carbon nanotube segment 223 gradually separates from the growing substrate of the carbon nanotube array along the drawing direction under the drawing force, the other carbon nanotube segments 223 that are adjacent to the selected carbon nanotube segment 223 are successively drawn out end to end under the action of the van der Waals force, thus forming a successive and uniform carbon nanotube film having a width and preferred orientation.

The carbon nanotube film has a unique impedance property because the carbon nanotube film has a minimum electrical impedance in the drawing direction, and a maximum electrical impedance in the direction perpendicular to the drawing direction, thus the carbon nanotube film has an anisotropic impedance property. A relatively low impedance direction D is the direction substantially parallel to the aligned direction of the carbon nanotubes, and a relatively high impedance direction H is substantially perpendicular to the aligned direction of the carbon nanotubes. The carbon nanotube film can have a square shape with four sides. Two sides are opposite to each other and substantially parallel to the relatively high impedance direction H. The other two sides are opposite to each other and substantially parallel to the relatively low impedance direction D. In one embodiment, a ratio between the impedance at the relatively high impedance direction H and the impedance at the relatively low impedance direction D of the carbon nanotube film is equal to or greater than 50 (e.g., in a range from 70 to 500).

The transparent conductive layer 122 can include a plurality of carbon nanotube films laminated to each other or arranged side to side. The carbon nanotubes in the plurality of carbon nanotube films are aligned along the same direction. The carbon nanotube film can have a transmittance of visible light above 85%.

The transparent conductive layer 122 also can be a carbon nanotube composite film. The carbon nanotube composite film includes the carbon nanotube film and a polymer material infiltrating the carbon nanotube film. Spaces can exist between adjacent carbon nanotubes in the carbon nanotube film and thus the carbon nanotube film defines a number of micropores by the adjacent carbon nanotubes. The polymer material is filled into the number of micropores of the carbon nanotube film to form the carbon nanotube composite film. The polymer material can be distributed uniformly in the carbon nanotube composite film. The polymer material can be polystyrene, polyethylene, polycarbonate, polymethyl methacrylate (PMMA), polycarbonate (PC), polyethylene terephthalate (PET), benzocyclobutene (BCB), or polyalkenamer. In one embodiment, the polymer material is PMMA. The carbon nanotube composite film can include one or more carbon nanotube films. The carbon nanotube composite film can have a uniform thickness. A thickness of the carbon nanotube composite film is only limited by the degree of transparency desired. In one embodiment, the thickness of the carbon nanotube composite film can range from about 0.5 nanometers to about 100 microns.

The polarizer 12 can further include a conducting wire (not shown), to electrically connect the driving-sensing electrodes 124 to an outer circuit. The conducting wire can be arranged around the transparent conductive layer 122 with the driving-sensing electrodes 124.

Figure 5:
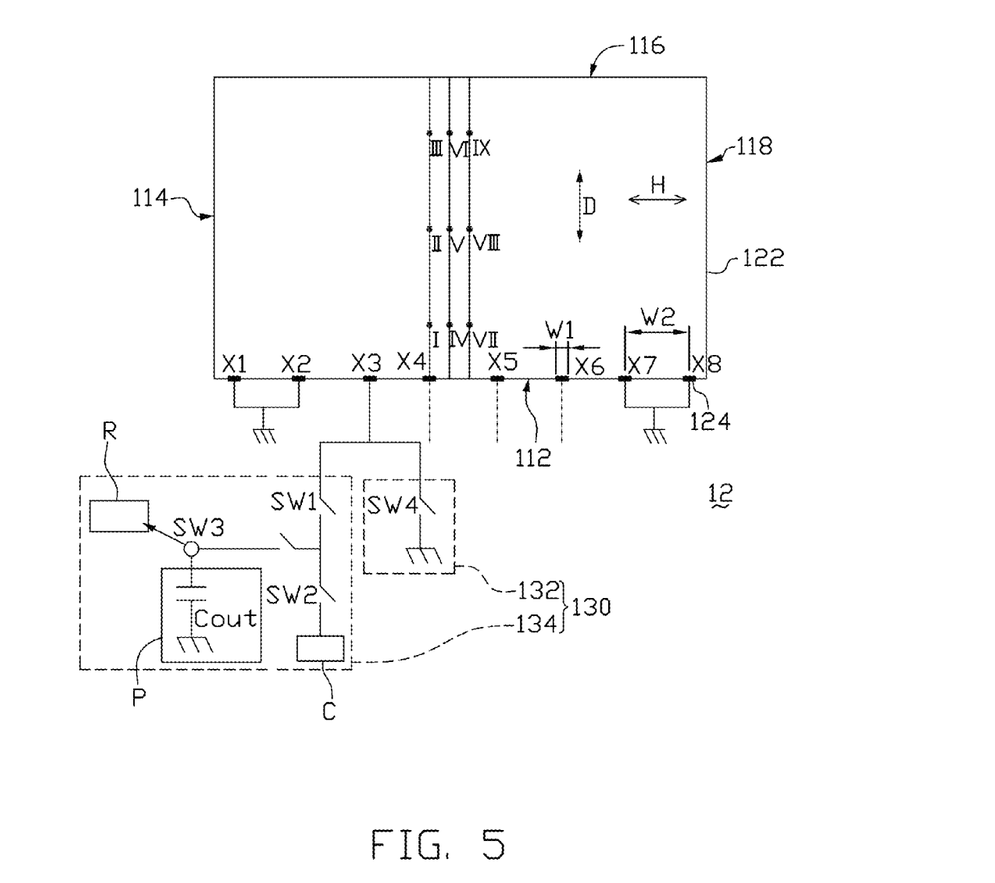
FIG. 5 is a schematic view of an embodiment of a polarizer including a driving circuit.

Referring to FIG. 5, in one embodiment, the transparent conductive layer 122 is the carbon nanotube film with the rectangle shape. Four sides of the carbon nanotube film are labeled as 112, 114, 116, and 118. Sides 112 and 116 are opposite to each other and parallel with the relatively high impedance direction H. Sides 114 and 118 are opposite to each other and parallel with the relatively low impedance direction D.

The plurality of driving-sensing electrodes 124 are arranged in a row on the side 112 and electrically connected with the transparent conductive layer 122. The polarizer 12 further can include at least one driving circuit 130. The driving circuit 130 is connected to one or more of the driving-sensing electrodes 124. The driving circuit 130 can have different kinds of components and connections. One electrical circuit design will be illustrated as an example, and not to be construed as a limit to the present disclosure. In one embodiment, the polarizer 12 includes a single driving circuit 130 connected to each of the driving-sensing electrodes 124 one by one using a multiplexer, or some other components and configuration. In another embodiment, the polarizer 12 includes a plurality of driving circuits 130, and each of the driving circuits 130 is connected to each of the driving-sensing electrodes 124 in a one to one manner or in a one to more manners. FIG. 5 illustrates an example of the driving circuit 130 connected to one driving-sensing electrode 124. However, at least a plurality of or all the driving-sensing electrodes 124 can be connected to the driving circuit 130.

In one embodiment, the driving circuit 130 includes a grounding unit 132 and a scanning unit 134. The scanning unit 134 includes a charging circuit C, a storage circuit P, and a readout circuit R. The charging circuit C and the storage circuit P are connected in parallel, and the readout circuit R is connected to the storage circuit P.

In one embodiment, the driving circuit 130 has four switches SW1, SW2, SW3, and SW4. The switch SW1 controls the electrical connection between the charging circuit C, the storage circuit P, and the readout circuit R in the scanning unit 134 to the driving-sensing electrode 124. The switch SW2 controls the connection between the charging circuit C to the switch SW1. The switch SW3 controls the connection between the storage circuit P and the readout circuit R to the switch SW1. The switch SW4 is arranged in the grounding unit 132 and controls grounding the driving-sensing electrode 124.

In one embodiment, the driving mode of the polarizer 12 is progressive scanning the driving-sensing electrodes 124 to receive the signals from the scanned driving-sensing electrodes 124. The progressive scanning means that the driving-sensing electrodes 124 are scanned by the scanning unit 134 group by group or one by one. During the scanning of one driving-sensing electrode 124, the driving-sensing electrode 124 is electrically connected to the scanning unit 134. When one or more of the driving-sensing electrodes 124 is electrically connecting to the scanning unit 134, all the other groups or other driving-sensing electrodes 124 are electrically connected to the grounding unit 132. A scanning order does not depend on the location of the driving-sensing electrodes 124. For example, the driving-sensing electrodes 124 in FIG. 5 can be scanned from left to right, from right to left, with one interval, with several intervals, or randomly scanned.

The driving-sensing electrodes 124 of the polarizer 12 can be orderly arranged electrode X1, electrode X2, electrode X3, electrode X4, electrode X5, electrode X6, electrode X7, and electrode X8. In one embodiment, the switch SW1 of the scanning unit 134 needs to be closed, and the switch SW4 of the grounding unit 132 needs to be open, before the electrode X3 can electrically connect to the scanning unit 134. The switch SW4 of the grounding unit 132 needs to be closed, and the switch SW1 of the scanning unit 134 needs to be open, before the electrode X3 can electrically connect to the grounding unit 132. The grounding unit 132 can be connected to a grounding electric potential or a fixed electric potential, or the grounding unit 132 itself can be a high impedance component.

Figure 6:
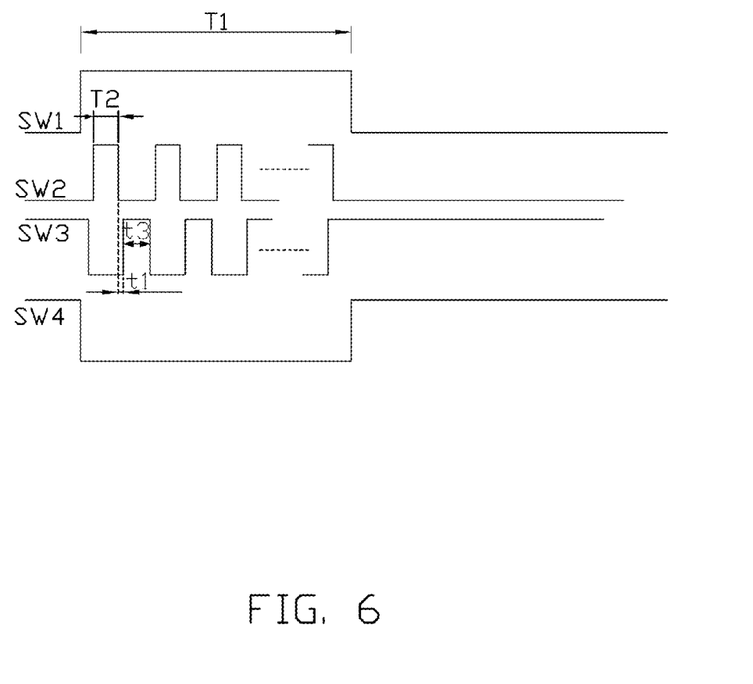
FIG. 6 is a driving waveform diagram during a scanning of one embodiment of switches of the driving circuit.

FIG. 6 is a driving waveform diagram during a scanning of one embodiment of the switches of a driving circuit. Referring to FIG. 6, the waveforms from top to bottom are the waveforms of switch SW1, switch SW2, switch SW3, and switch SW4. Time period T1 is the time when the scanning action is processed. The waveform may have a high level and a low level. The voltage of the waveform in the high level is higher than the voltage of the waveform in the low level. In the present embodiment, during the time period of a high level of each waveform, a corresponding switch SW1 to SW4 is closed (i.e., turn on), and during the time period of a low level of each waveform, a corresponding switch SW1 to SW4 is open (i.e., turn off).

Referring to FIG. 5 and FIG. 6, in the time period T1, the switch SW1 is closed, and the switch SW4 is open. Therefore, the corresponding driving-sensing electrode 124 is electrically connected to the scanning unit 134 to be scanned. In the time period T1, the switch SW2 and the switch SW3 alternate close and open. For example, in the time period T1, when the switch SW2 is closed, the switch SW3 is open, and when the switch SW3 is closed the switch SW2 is open, and alternating. In the present embodiment, the switch SW2 and the switch SW3 are closed at the time periods T2 and T3 respectively, and after the switch SW2 opens, the closing of the switch SW3 is delayed a delaying time period t1. Therefore, in the time period T1, the corresponding driving-sensing electrodes 124 will be alternately connected to the charging circuit C and the storage circuit P. In one embodiment, the time period T1 is about 20 microseconds, the time period T2 and the time period T3 are about 0.3 microseconds, and the time period t1 is about 0.025 microseconds. However, in some other driving modes, the time period T3 can nearly follow the time period T2, thus the time period t1 is about zero. The lengths of these time periods are decided by the capacity of the driving circuit 130 and the size of the actual product.

In the present embodiment, the charging circuit C connects to a voltage source (not shown), and the storage circuit P connects to an external capacitance Cout. When a user or a conductive medium touches the polarizer 12, a contact capacitance is formed between the carbon nanotube film and the user or the conductive medium. At this time, the charging circuit C and the storage circuit P will alternately charge and discharge the contact capacitance. The readout circuit R can then read the charging amount of the contact capacitance during the time period T1, such as reading a voltage value, to be a determining basis of the touch location. The above described design is only one example of the driving circuit 130. In other embodiments, the driving circuit 130 can be composed by other functional components. That is to say, all circuit designs that can be connected to the driving-sensing electrodes 124 to determine the contact capacitance can be used by the driving circuit 130.

Referring to FIG. 5, in one simulation test, a contact area of each contact action is set, to be 5 mm×5 mm, and the external capacitance $C_{out}$ set in the storage circuit P is 100 pf. In this simulation test, nine touch locations are emulated. The center points of these touch locations are location I to location IX. Location I to location III are aligned with the electrode X4. Location IV to location VI are at locations respectively deviated from the location I to location III toward the electrode X5. Locations VII to locations IX are at locations respectively deviated from the location IV to location VI toward the electrode X5. In the present test, the distance between the location VII to location IX and the electrode X4 is set to be equal to the distance between the location VII to location IX and the electrode X5.

Figure 7:
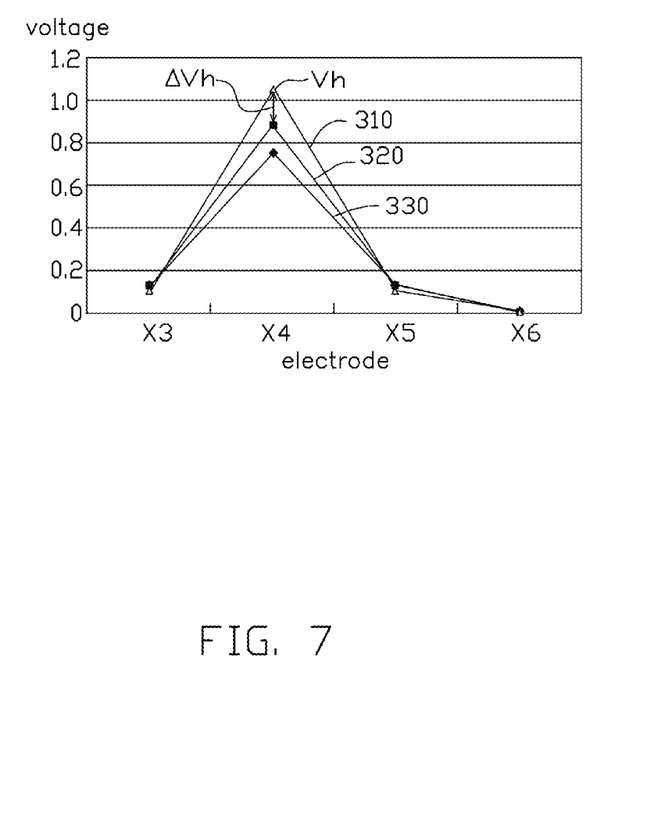
FIG. 7 to FIG. 9 show signals received by electrodes X3 to X6 in a simulation test.
Figure 8:
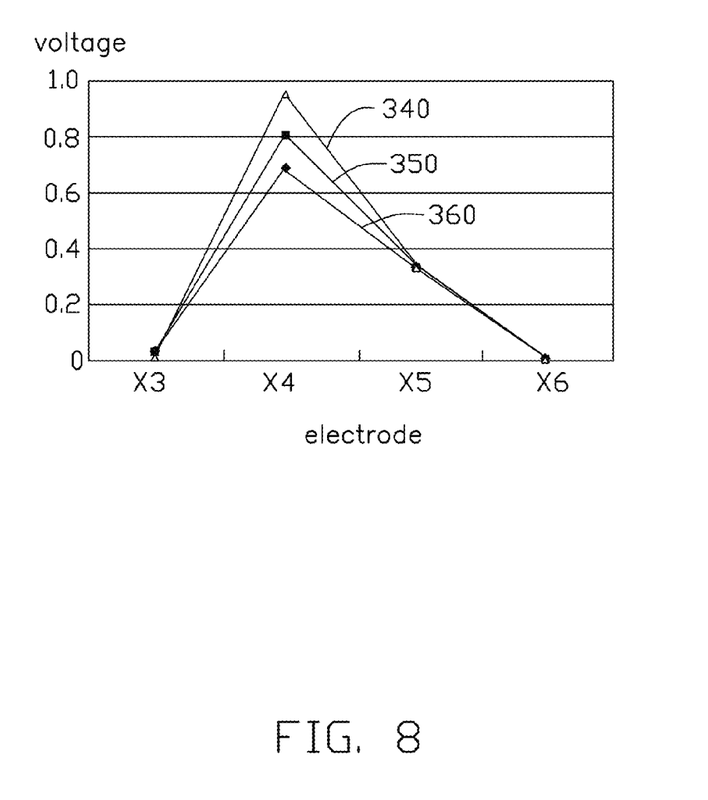
Figure 9:
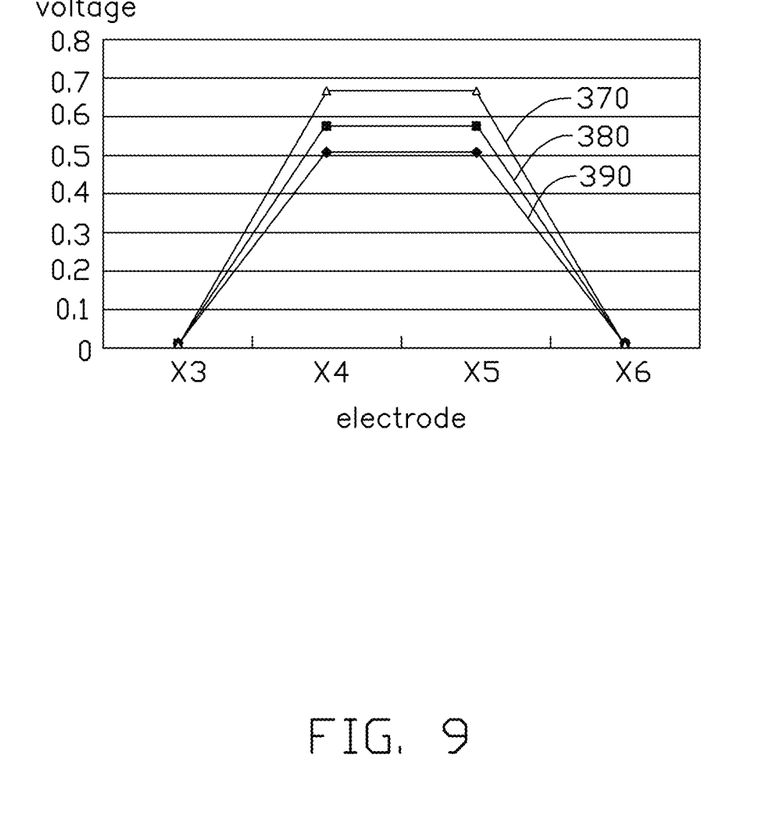

FIG. 7 to FIG. 9 show the signals received by the electrode X3 to X6 in the simulation test. Referring to FIG. 5 and FIG. 7, the carbon nanotube film of the present embodiment has an anisotropic impedance property, thus the conducting path of a current is primarily parallel to the relatively low impedance direction D. When the location I is touched, the signal received by the electrodes X3 to X6 (i.e., the voltage read by the readout circuit R) is the polygonal chain 310 shown in FIG. 7. When the location II and the location III are touched, signals received by the electrodes X3 to X6 are respectively the polygonal chain 320 and polygonal chain 330 shown in FIG. 7.

Although the location I to location III are all aligned with the electrode X4, different signals can be produced. When the location III is touched, the signal received by the electrode X4 is the smallest. In the emulation, the closer the touch locations I to IX to the driving-sensing electrode 124, the greater the signal received by the corresponding driving-sensing electrode 124. Therefore, the polarizer 12 can determine the coordinate at the relatively low impedance direction D of the touch location from the value of the signal received by the driving-sensing electrode 124.

Referring to FIG. 8, the polygonal chain 340 to polygonal chain 360 orderly are the signals received by the electrode X3 to the electrode X6 when the touch locations are at the location IV to location VI. As the location IV to location VI are deviated to the electrode X5 respectively compared with the location I to location III, the electrode X4 and the electrode X5 both can charge and discharge the contact capacitance. However, when the touch locations are at the location IV to location VI, the signals received by the electrode X4 is greater than the signals received by the electrode X5.

Similarly, referring to FIG. 9, the polygonal chain 370 to the polygonal chain 390 are the signals received by the electrode X3 to the electrode X6 when the touch locations are at the location VII to location IX. When the touch location is at one of the location VII to location IX, the electrode X4 and the electrode X5 can receive the same signals. It can be known from the signal relationship from FIG. 7 to FIG. 9 that the coordinate at the relatively high impedance direction H of the touch location can be determined by comparing the signals received by three adjacent driving-sensing electrodes 124. For example, to determine the coordinate at the relatively high impedance direction H of the touch location, an interpolation or addition method at a ratio relationship of the two largest signals received by the three adjacent driving-sensing electrodes 124 can be used to determine the corresponding coordinate value. The ratio relationship can be determined by the variation of the signal values received during the simulation process.

After the polarizer 12 is formed, emulation tests can be performed at various locations to calculate the variation relationships between the signals received by each driving-sensing electrodes 124 and different touch locations. The relationships are built in a driving chip and can be used as the touch location determination basis when the user actually manipulates the polarizer 12.

The signals received by every driving-sensing electrode 124 directly reflect a far or near of the touch locations because of the anisotropic impedance property of the carbon nanotube film. Therefore, the polarizer 12 has a relatively superior sensing accuracy. The polarizer 12 can also determine the touch location by directly reading the signal values received from the electrodes and comparing the signal values received by adjacent electrodes. Thus, the polarizer 12 does not need a complicated driving method or a calculating program. In general, the polarizer 12 proposed by the present embodiment has characteristics of simple structure, high sensing accuracy, and simple driving method.

Figure 10:
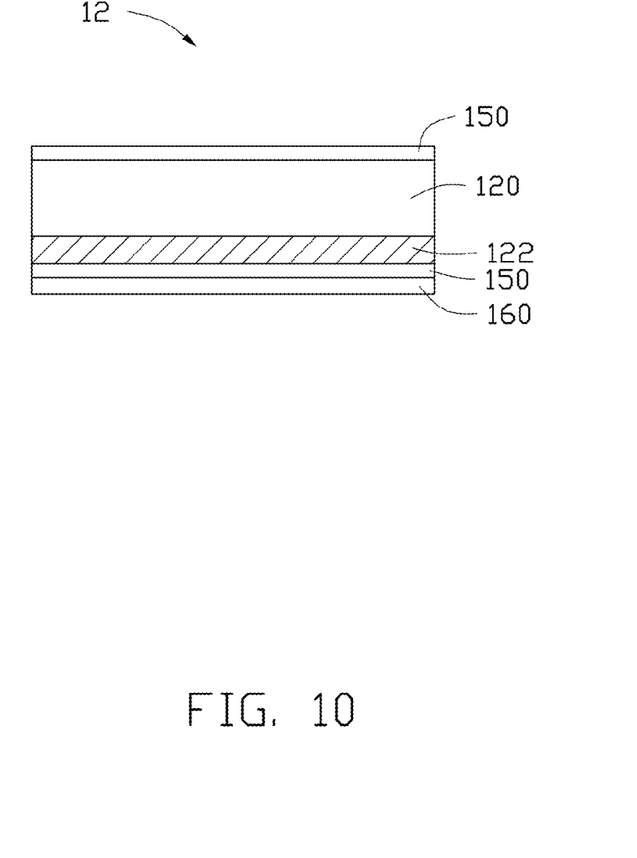
FIG. 10 is a side view of another embodiment of a polarizer.

Referring to FIG. 10, the polarizer 12 can further include at least one of a protective layer 150, and an adhesive layer 160. The protective layer 150 is used to protect the first polarizing layer 120 and the transparent conductive layer 122. The adhesive layer 160 is used to combine the polarizer 12 with the liquid crystal module 14. The material of the protective layer 150 can be at least one of triacetyl cellulose (TAC), polystyrene, polyethylene, polyethylene terephthalate (PET), poly (methyl methacrylate) (PMMA), polycarbonate (PC), and benzocyclobutene (BCB). The material of the adhesive layer 160 can be UV adhesive, pressure sensitive adhesive, or thermal sensitive adhesive.

The first polarizing layer 120 can solely form a polarizer main body, or cooperatively form the polarizer main body with at least one of the protective layer 150 and the adhesive layer 160. The transparent conductive layer 122 can be arranged on a surface of the polarizer main body, or inserted into the polarizer main body.

In one embodiment, the polarizer 12 includes two protective layers 150 respectively attached to the surface of the transparent conductive layer 122 and the surface of the first polarizing layer 120, to sandwich the transparent conductive layer 122 and the first polarizing layer 120 between the two protective layers 150. The transparent conductive layer 122 and the first polarizing layer 120 are located between the two protective layers 150. The adhesive layer 160 is arranged on the surface of the protective layer 150 which is near to the transparent conductive layer 122.

Figure 11:
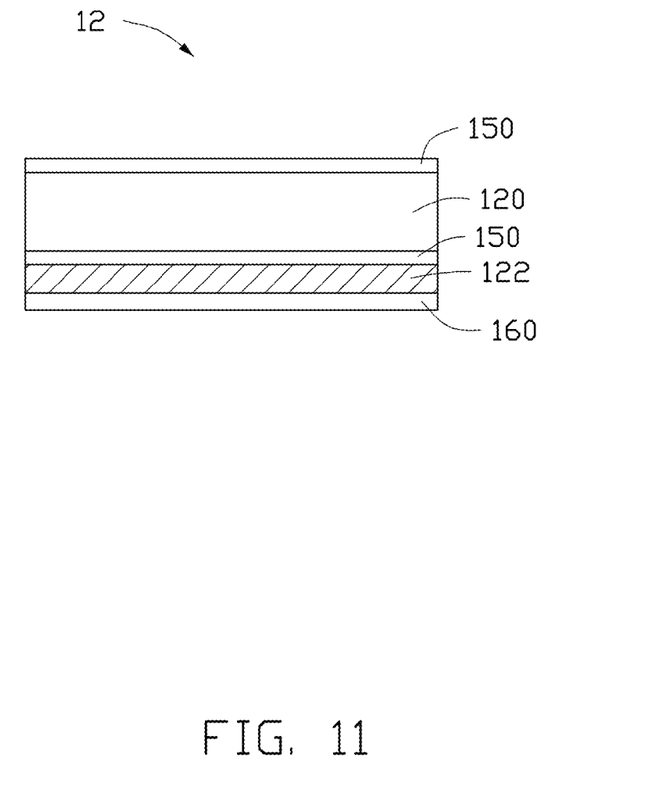
FIG. 11 is a side view of yet another embodiment of a polarizer.

Referring to FIG. 11, in another embodiment, the polarizer 12 includes two protective layers 150 respectively attached to the two surfaces of the first polarizing layer 120, to sandwich the first polarizing layer 120 between the two protective layers 150. The first polarizing layer 120 is located between the two protective layers 150. The transparent conductive layer 122 is arranged on the outer surface of one of the two protective layers 150. The one of the two protective layers 150 is located between the transparent conductive layer 122 and the first polarizing layer 120. The adhesive layer 160 is arranged on the outer surface of the transparent conductive layer 122, to sandwich the transparent conductive layer 122 between the adhesive layer 160 and the protective layer 150.

Figure 12:
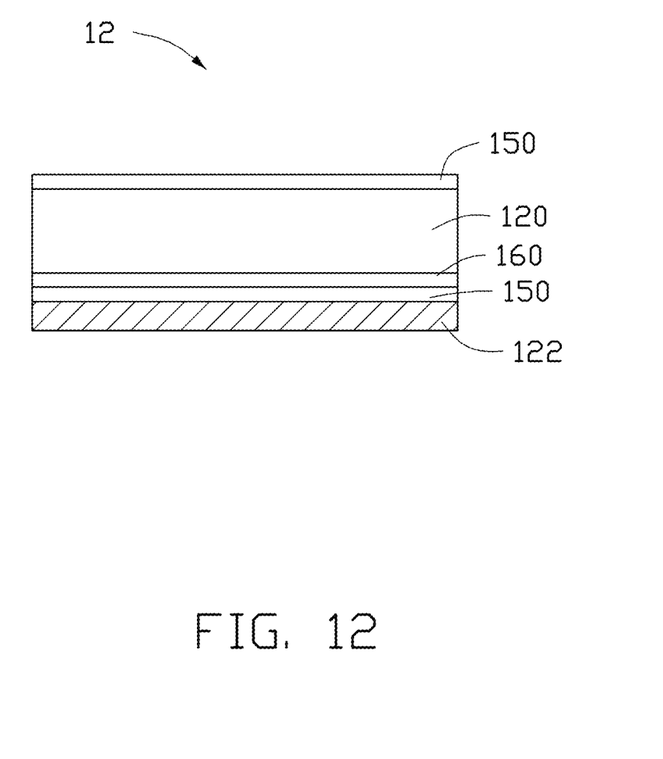
FIG. 12 is a side view of yet another embodiment of a polarizer.

Referring to FIG. 12, in yet another embodiment, the polarizer 12 includes two protective layers 150 respectively attached to the two surfaces of the first polarizing layer 120, to sandwich the first polarizing layer 120 between the two protective layers 150. The adhesive layer 160 is arranged on the outer surface of one of the two protective layers 150. The transparent conductive layer 122 is arranged on the outer surface of the adhesive layer 160, to sandwich the adhesive layer 160 between the transparent conductive layer 122 and the protective layer 150.

In the above described embodiments, the transparent conductive layer 122 can be the freestanding carbon nanotube film having the anisotropic impedance property. The polarizer 12 can use only the single carbon nanotube film to sense the multi-touch. The freestanding carbon nanotube film can be formed independently from the other parts of the polarizer 12, and further attached to the needing surface in the polarizer 12.

Referring back to FIG. 1, the liquid crystal module 14 is disposed on the surface of transparent conductive layer 122 away from the first polarizing layer 120. The liquid crystal module 14 includes an upper substrate 141, an upper electrode layer 142, a first alignment layer 143, a liquid crystal layer 144, a second alignment layer 145, a thin film transistor panel 146, and a second polarizing layer 147 stacked in sequences.

The upper substrate 141 can be a transparent plate. The upper substrate 141 can be made of glass, quartz, diamond, plastic or resin. A thickness of the upper substrate 141 can range from about 1 millimeter to about 1 centimeter. In one embodiment, the upper substrate 141 is a PET film and the thickness of the upper substrate 141 is about 2 millimeters.

The upper electrode layer 142 can include conductive materials, such as metals, ITO, ATO (tin antimony oxide), conductive polymer materials, or carbon nanotubes.

The first alignment layer 143 can include a plurality of substantially parallel first grooves (not shown) located on a lower surface of the first alignment layer 143. The second alignment layer 145 can include a plurality of substantially parallel second grooves (not shown) located on an upper surface of the second alignment layer 145. An alignment direction of the first grooves is substantially perpendicular to an alignment direction of the second grooves. Therefore, the alignment direction of the liquid crystal molecules differ by about 90 degrees between the first alignment layer 143 and the second alignment layer 145, which play a role in shifting the light beams by 90 degrees.

A material of the first alignment layer 143 and the second alignment layer 145 can be polystyrenes and derivatives of the polystyrenes, polyimides, polyvinyl alcohols, polyesters, epoxy resins, polyurethanes, or other polysilanes. The first grooves and the second grooves can be formed by a rubbing method, a tilt deposition method, a micro-grooves treatment method, or a SiOx-depositing method. In one embodiment, the material of the first alignment layer 143 and the second alignment layer 145 is polyimide and a thickness thereof ranges from about 1 micrometer to about 50 micrometers.

The liquid crystal layer 144 includes a plurality of oval shaped liquid crystal molecules. Understandably, the liquid crystal layer 144 can also be made of other conventional suitable materials, such as alkyl benzoic acid, alkyl cyclohexyl acid, alkyl cyclohexyl-phenol, and phenyl cyclohexane. A thickness of the liquid crystal layer 144 ranges from about 1 micrometer to about 50 micrometers. In one embodiment, the thickness of the liquid crystal layer 144 is about 5 micrometers.

The detailed structure of the thin film transistor panel 146 is not shown in FIG. 1. It is to be understood that the thin film transistor panel 146 can further include a transparent base, a number of thin film transistors located on the transparent base, a number of pixel electrodes, and a display driver circuit (not shown). The thin film transistors correspond to the pixel electrodes in a one-to-one manner. The thin film transistors are connected to the display driver circuit by the source lines and gate lines. The pixel electrodes are controlled to cooperate with the upper electrode layer 142 to apply a voltage to the liquid crystal layer 144. The pixel electrodes correspond to a touch region 126.

The second polarizing layer 147 can cooperate with the first polarizing layer 120 to control light extraction intensity of the liquid crystal module 14. Materials of the first polarizing layer 120 and the second polarizing layer 147 can be the same. A polarizing direction of the second polarizing layer 147 can be substantially perpendicular to the polarizing direction of the first polarizing layer 120.

In one embodiment, the first polarizing layer 120 can be disposed on and directly contact the surface of the upper substrate 141 away from the second polarizing layer 147 to form the liquid crystal display module 10. In other words, in the liquid crystal display module 10, the first polarizing layer 120 can be disposed between the transparent conductive layer 122 and the upper substrate 141.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A liquid crystal display module comprising:
   a liquid crystal module comprising an upper substrate, an upper electrode layer, a first alignment layer, a liquid crystal layer, a second alignment layer, a thin film transistor panel, and a second polarizing layer stacked in sequence; and
   a polarizer located on the upper substrate, the polarizer having touch sensing capability, the polarizer comprising:
     a first polarizing layer located on the upper substrate;
     a transparent conductive layer stacked with the first polarizing layer, the transparent conductive layer being an anisotropic impedance layer having a relatively low impedance direction, an electrical conductivity of the anisotropic impedance layer on the relatively low impedance direction being greater than electrical conductivities of the anisotropic impedance layer on other directions; and
     a plurality of driving-sensing electrodes being spaced from each other and arranged in a row along a direction substantially perpendicular to the relatively low impedance direction and electrically connected with the transparent conductive layer;
   wherein a polarizing direction of the first polarizing layer is substantially parallel to the relatively low impedance direction.

2. The liquid crystal display module of claim 1, wherein the transparent conductive layer comprises a carbon nanotube film, a majority of carbon nanotubes in the carbon nanotube film is substantially aligned along the relatively low impedance direction.

3. The liquid crystal display module of claim 2, wherein the carbon nanotube film is a free-standing structure that is directly attached to a surface of the first polarizing layer.

4. The liquid crystal display module of claim 2, wherein the majority of carbon nanotubes are joined end to end by van der Waals attractive force therebetween.

5. The liquid crystal display module of claim 2, wherein the polarizer further comprises at least one driving circuit, the at least one driving circuit is electrically connected to one or more of the plurality of driving-sensing electrodes.

6. The liquid crystal display module of claim 5, wherein the at least one driving circuit comprises a grounding unit and a scanning unit, the plurality of driving-sensing electrodes are selectively connected to the grounding unit and scanning unit.

7. The liquid crystal display module of claim 6, wherein the scanning unit comprises a charging circuit, a storage circuit, and a readout circuit, the charging circuit and the storage circuit are connected in parallel, and the readout circuit is connected to the storage circuit.

8. The liquid crystal display module of claim 1, wherein the plurality of driving-sensing electrodes are arranged on a side of the transparent conductive layer and the side is perpendicular to the relatively low impedance direction.

9. The liquid crystal display module of claim 1, wherein the polarizer further comprises a protective layer disposed between the first polarizing layer and the transparent conductive layer.

10. The liquid crystal display module of claim 9, wherein the polarizer further comprises an adhesive layer disposed on a surface of the transparent conductive layer away from the first polarizing layer.

11. The liquid crystal display module of claim 1, wherein the polarizer further comprises a protective layer disposed on a surface of the transparent conductive layer away from the first polarizing layer.

12. The liquid crystal display module of claim 11, wherein the polarizer further comprises an adhesive layer disposed on a surface of the protective layer away from the transparent conductive layer.

13. The liquid crystal display module of claim 1, wherein the transparent conductive layer is disposed between the first polarizing layer and the liquid crystal module.

14. The liquid crystal display module of claim 1, wherein the plurality of driving-sensing electrodes directly contact the transparent conductive layer.

15. The liquid crystal display module of claim 1, wherein the first polarizing layer is disposed on and directly contact a surface of the upper substrate.

* * * * *